(12) United States Patent
Chang et al.

(10) Patent No.: US 9,893,871 B2
(45) Date of Patent: Feb. 13, 2018

(54) IN-BAND FULL DUPLEX TRANSCEIVER

(71) Applicants: Electronics and Telecommunications Research Institute, Daejeon (KR); HANDONG GLOBAL UNIVERCITY INDUSTRY-ACADEMIC COOPERATION FOUNDATION, Pohang-si Gyeongsangbuk-do (KR)

(72) Inventors: Kapseok Chang, Daejeon (KR); Seon-Ae Kim, Daejeon (KR); Hyung Sik Ju, Daejeon (KR); Youngsik Kim, Pohang-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 125 days.

(21) Appl. No.: 14/928,270

(22) Filed: Oct. 30, 2015

(65) Prior Publication Data
US 2016/0127111 A1    May 5, 2016

(30) Foreign Application Priority Data

| Oct. 31, 2014 | (KR) | ........................ 10-2014-0150693 |
| Nov. 17, 2014 | (KR) | ........................ 10-2014-0160310 |
| Oct. 28, 2015 | (KR) | ........................ 10-2015-0150168 |

(51) Int. Cl.
*H04B 7/00* (2006.01)
*H04L 5/14* (2006.01)
(Continued)

(52) U.S. Cl.
CPC ............. *H04L 5/14* (2013.01); *H04B 1/0458* (2013.01); *H04B 1/123* (2013.01); *H04B 1/18* (2013.01);
(Continued)

(58) Field of Classification Search
CPC ......... H04L 5/14; H04B 1/0458; H04B 1/123; H04B 1/18; H04B 1/50; H04B 1/525; H04B 15/00
(Continued)

(56) References Cited

U.S. PATENT DOCUMENTS

| 5,388,092 | A | * | 2/1995 | Koyama | .................. H04B 3/23 370/289 |
| 5,450,457 | A | * | 9/1995 | Ito | ........................ H04L 7/0062 375/355 |

(Continued)

OTHER PUBLICATIONS

B. van Liempd et al., "RF Self-Interference Cancellation for Full-Duplex," 2014 9th International Conference on Cognitive Radio Oriented Wireless Networks (CROWNCOM), 2014, pp. 526-531, ICST.

*Primary Examiner* — Sai-Ming Chan
(74) *Attorney, Agent, or Firm* — William Park & Associates Ltd.

(57) ABSTRACT

Disclosed is an in-band full duplex transceiver. The in-band full duplex transceiver may include a transmitter, a hybrid transformer, and an impedance matching unit. The hybrid transformer may include a first end connected to an antenna, may output a transmitting signal to the antenna, and may output a received signal provided through the antenna to the receiver. The impedance matching unit may include balance networks connected to a second end of the hybrid transformer and matching impedance of the antenna.

20 Claims, 8 Drawing Sheets

(51) Int. Cl.
*H04B 1/50* (2006.01)
*H04B 15/00* (2006.01)
*H04B 1/04* (2006.01)
*H04B 1/12* (2006.01)
*H04B 1/18* (2006.01)
*H04B 1/525* (2015.01)

(52) U.S. Cl.
CPC .............. *H04B 1/50* (2013.01); *H04B 1/525* (2013.01); *H04B 15/00* (2013.01)

(58) Field of Classification Search
USPC ........................................................ 370/277
See application file for complete search history.

(56) References Cited

U.S. PATENT DOCUMENTS

| | | | |
|---|---|---|---|
| 5,886,986 A | 3/1999 | Lee et al. | |
| 6,169,912 B1* | 1/2001 | Zuckerman ............ | H04B 1/525 455/570 |
| 6,373,352 B1 | 4/2002 | Lee et al. | |
| 2009/0068974 A1* | 3/2009 | Smith ...................... | H04B 1/30 455/304 |
| 2011/0222591 A1* | 9/2011 | Furudate ................ | H04B 1/123 375/224 |
| 2013/0335291 A1* | 12/2013 | Judson .................... | H01Q 1/50 343/861 |

* cited by examiner

IN-BAND FULL DUPLEX TRANSCEIVER

CROSS-REFERENCE TO RELATED APPLICATION

This application claims priority to and the benefit of Korean Patent Application No. 10-2014-0150693, 10-2014-0160310 and 10-2015-0150168 filed in the Korean Intellectual Property Office on Oct. 31, 2014, Nov. 17, 2014 and Oct. 28, 2015, respectively, the entire contents of which are incorporated herein by reference.

BACKGROUND OF THE INVENTION (a) Field of the Invention

The present invention relates to an in-band full duplex transceiver.

(b) Description of the Related Art

A current wireless communication system uses a half duplex method. The half duplex method transmits or receives signals by dividing time or frequency so orthogonality between transmitting and receiving may be maintained. However, the half duplex method wastes resources (time or frequency), has a problem in a multi-hop relay among mobile small cells, and requires additional overhead to solve a hidden node problem.

The in-band full duplex method is suggested as a solution for solving non-efficiency of the half duplex method. The in-band full duplex method represents a method for allowing simultaneous in-band transmitting/receiving. The in-band full duplex method may increase link capacity by twice to a maximum in a theoretical manner so it is an essential technique for achieving 1000 times the traffic capacity required by the 5G mobile communication.

However, the in-band full duplex method allows a self-transmitting signal to be input to a receiver so the self-transmitting signal functions as a self-interference signal very strongly compared to a valid received signal, which is a drawback. To cancel the self-interference (called self-interference cancellation (SIC)), an antenna region SIC technique for physically separating a transmitting antenna from a receiving antenna with a large distance therebetween has been provided. A technique for reducing a self-interference level by using the antenna region SIC technique, and canceling remaining self-interference in a digital region, is called an interference cancellation system (ICS) technique. A problem of the ICS technique is that it is impossible to be applied to a small device because of the physical separation between the transmitting and receiving antennas.

An electrical balance duplex (EBD) is one of SIC techniques in the in-band full duplex method, but the EBD technique deteriorates SIC performance or destabilizes it as the system bandwidth becomes wider. That is, the existing EBD technique has a problem in that an SIC gain is great for a specific frequency bandwidth and it becomes less in other frequency bandwidths.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an in-band full duplex transceiver applicable to a wideband.

An exemplary embodiment of the present invention provides an in-band full duplex transceiver including: a transmitter for generating a transmitting signal; a hybrid transformer including a first end connected to an antenna, outputting the transmitting signal to the antenna, and outputting a received signal provided through the antenna to a receiver; and an impedance matching unit including a plurality of balance networks connected to a second end of the hybrid transformer, and matching impedance of the antenna.

A sum of impedances of the balance networks may correspond to impedance of the antenna.

The balance networks may be configured with at least one of a capacitor, an inductor, and a resistor, and the plurality of balance networks may tune different frequency bandwidths.

The hybrid transformer may transmit the transmitting signal to the impedance matching unit.

The hybrid transformer may include a receiving output end for outputting the received signal, and the in-band full duplex transceiver may further include a finite impulse response (FIR) filter for receiving the transmitting signal, and canceling a self-transmitting interference signal included in a signal output by the receiving output end.

The FIR filter may include: a plurality of delay units for receiving the transmitting signal and delaying the same; a plurality of attenuators connected to the delay units and attenuating a signal; and a controller for setting an attenuation degree of the attenuator so as to cancel the self-transmitting interference signal, and the controller may set the attenuation degree for minimizing the self-transmitting interference signal by using a signal generated by converting the self-transmitting interference signal into a frequency domain and a signal generated by converting the transmitting signal into the frequency domain.

The receiving output end may include a first receiving output end and a second receiving output end, and a first signal output by the first receiving output end and a second signal output by the second receiving output end may be phase-inverted signals from each other.

The in-band full duplex transceiver may further include a first combiner for combining the first signal and the second signal, and a second combiner for combining an output signal of the first combiner and an output signal of the FIR filter, and outputting a resultant signal to the receiver, wherein the FIR filter may output a signal for canceling a self-transmitting interference signal included in the output signal of the first combiner to the second combiner.

The FIR filter may include a first FIR filter for receiving the transmitting signal and canceling the self-transmitting interference signal included in the first signal and a second FIR filter for receiving the transmitting signal and canceling the self-transmitting interference signal included in the second signal, and the in-band full duplex transceiver may further include a first combiner for combining the first signal and an output signal of the first FIR filter, and outputting a resultant signal to the receiver, and a second combiner for combining the second signal and an output signal of the second FIR filter, and outputting a resultant signal to the receiver.

The in-band full duplex transceiver may further include: a first combiner for combining the first signal and the second signal; a second combiner for combining an output signal of the first combiner and an output signal of the second end of the hybrid transformer; and a third combiner for combining an output signal of the second combiner and an output signal of the FIR filter, and outputting a resultant signal to the receiver, wherein the FIR filter may output a signal for canceling a self-transmitting interference signal included in the output signal of the second combiner to the third combiner.

The in-band full duplex transceiver may further include a first combiner for combining the first signal and an output signal of the second end of the hybrid transformer and a second combiner for combining the second signal and an output signal of the second end of the hybrid transformer, the FIR filter may include a first FIR filter for receiving the transmitting signal and canceling the self-transmitting interference signal included in the output signal of the first combiner and a second FIR filter for receiving the transmitting signal and canceling the self-transmitting interference signal included in the output signal of the second combiner, and the in-band full duplex transceiver may further include a third combiner for combining the output signal of the first combiner and the output signal of the first FIR filter and a fourth combiner for combining the output signal of the second combiner and the output signal of the second FIR filter.

The hybrid transformer may include a receiving output end for outputting the received signal, and the in-band full duplex transceiver may further include a finite impulse response (FIR) filter for receiving a signal of the second end of the hybrid transformer, and canceling a self-transmitting interference signal included in a signal output by the receiving output end.

The receiving output end may include a first receiving output end and a second receiving output end, and a first signal output by the first receiving output end and a second signal output by the second receiving output end may be phase-inverted signals from each other.

The in-band full duplex transceiver may further include a first combiner for combining the first signal and the second signal, and a second combiner for combining an output signal of the first combiner and an output signal of the FIR filter, and outputting a resultant signal to the receiver, wherein the FIR filter may output a signal for canceling the self-transmitting interference signal included in the output signal of the first combiner to the second combiner.

The FIR filter may include a first FIR filter for receiving a signal of the second end of the hybrid transformer and canceling the self-transmitting interference signal included in the first signal and a second FIR filter or receiving a signal of the second end of the hybrid transformer and canceling the self-transmitting interference signal included in the second signal, and the in-band full duplex transceiver may further include a first combiner for combining the first signal and an output signal of the first FIR filter and outputting a resultant signal to the receiver, and a second combiner for combining the second signal and an output signal of the second FIR filter and outputting a resultant signal to the receiver.

Another embodiment of the present invention provides an in-band full duplex transceiver. The in-band full duplex transceiver may include: a power amplifier for outputting a transmitting signal; a transformer including a primary coil having a first end connected to an antenna and a middle tab for receiving an output signal of the power amplifier, and a secondary coil for inducing a received signal provided through the antenna; an impedance matching unit including a plurality of balance networks connected to a second end of the primary coil and matching impedance of the antenna; and a finite impulse response (FIR) filter for receiving the transmitting signal and canceling a self-transmitting interference signal included in signals output by respective ends of the secondary coil.

A sum of impedances of the balance networks may be determined corresponding to impedance of the antenna.

The balance networks may be configured with at least one of a capacitor, an inductor, and a resistor, and the balance networks may tune different frequency bandwidths.

The FIR filter may include: a plurality of delay units for receiving the transmitting signal and delaying the same; a plurality of attenuators connected to the delay units and attenuating a signal; and a controller for setting an attenuation degree of the attenuators so as to cancel the self-transmitting interference signal, and the controller may set the attenuation degree for minimizing the self-transmitting interference signal by using a signal generated by converting the self-transmitting interference signal into the frequency domain and a signal generated by converting the transmitting signal into the frequency domain.

The networks may be coupled in parallel with each other.

According to an exemplary embodiment of the present invention, the SIC gain may be improved in the wideband by matching the impedance by use of a plurality of balance networks.

According to another exemplary embodiment of the present invention, the finite impulse response (FIR) filter is used to cancel the self-transmitting interference signal, thereby reducing the wideband and the quantization error.

DETAILED DESCRIPTION OF THE EMBODIMENTS

Figure 1:
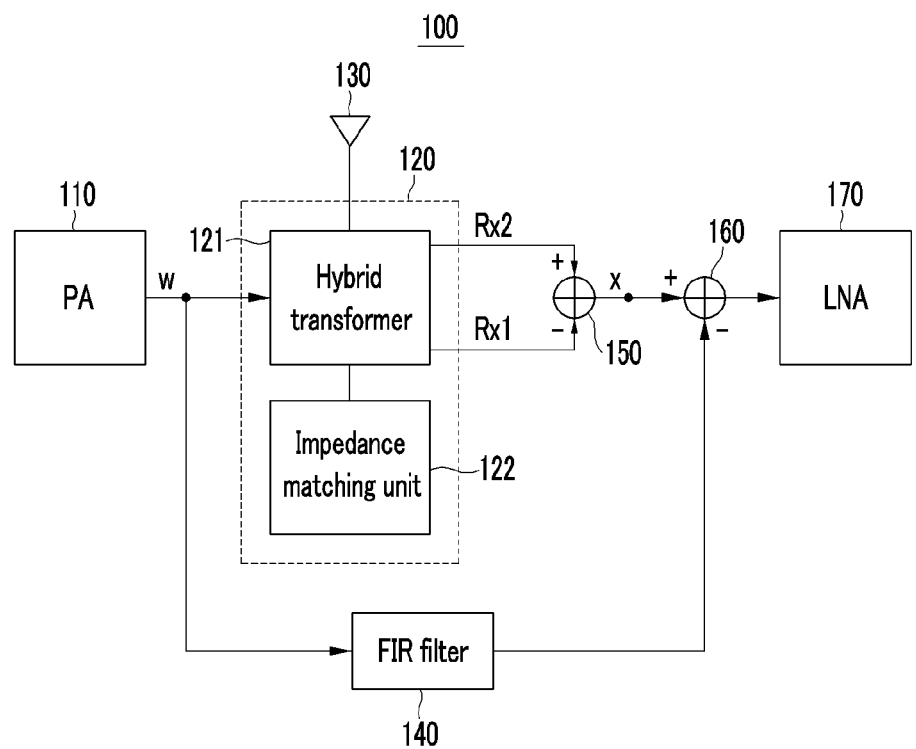
FIG. 1 shows an in-band full duplex transceiver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a transceiver may indicate a terminal, a mobile terminal (MT), a mobile station (MS), an advanced mobile station (AMS), a high-reliability mobile station (HR-MS), a subscriber station (SS), a portable subscriber station (PSS), an access terminal (AT), and user equipment (UE), and it may include entire or partial functions of the terminal, MT, AMS, HR-MS, SS, PSS, AT, and UE.

The transceiver may represent a base station (BS), an advanced base station (ABS), a high-reliability base station (HR-BS), a node B, an evolved node B (eNodeB), an access point (AP), a radio access station (RAS), a base transceiver station (BTS), a mobile multihop relay (MMR)-BS, a relay station (RS) for functioning as a base station, and a high-reliability relay station (HR-RS) for functioning as a base station, and it may include entire or partial functions of the ABS, nodeB, eNodeB, AP, RAS, BTS, MMR-BS, RS, and HR-RS.

FIG. 1 shows an in-band full duplex transceiver 100 according to an exemplary embodiment of the present invention.

As shown in FIG. 1, the in-band full duplex transceiver 100 includes a power amplifier (PA) 110, a divider 120, an antenna 130, a finite impulse response (FIR) filter 140, a first combiner 150, a second combiner 160, and a low noise amplifier (LNA) 170.

The PA 110 amplifies a radio frequency (RF) signal and outputs the same. In FIG. 1, a transmitting signal output by the PA 110 is denoted by w. The transmitting signal (w) is input to the divider 120 and the FIR filter 140. The PA 110 configures part of the transmitter.

The divider 120 is connected to the antenna 130 to transmit the signal (w) to the antenna 130. The divider 120 transmits a received signal provided by the antenna 130 to receiving output ends Rx1 and Rx2. That is, the divider 120 transmits the transmitting signal to the antenna 130 and transmits the received signal to the receiver (e.g., LNA).

Figure 2:
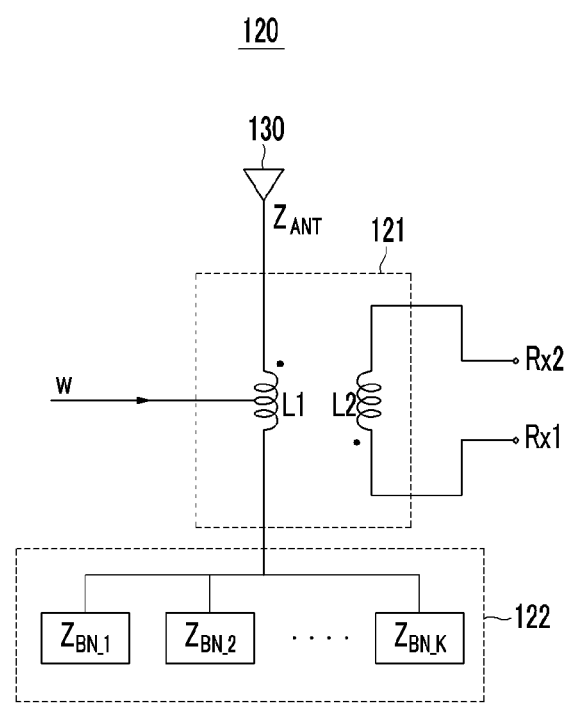
FIG. 2 shows a divider according to an exemplary embodiment of the present invention.

FIG. 2 shows a divider 120 according to an exemplary embodiment of the present invention.

As shown in FIG. 2, the divider 120 includes a hybrid transformer 121 and an impedance matching unit 122.

The hybrid transformer 121 includes a primary coil L1 and a secondary coil L2. The transmitting signal (w) is input to a middle tab of the primary coil L1, the antenna 130 is connected to a first end of the primary coil L1, and the impedance matching unit 122 is connected to a second end of the primary coil L1. The above-structured hybrid transformer 121 transmits the transmitting signal (w) to the antenna 130 and the impedance matching unit 122. The hybrid transformer 121 transmits the received signal provided by the antenna 130 to the secondary coil L2, and outputs the received signal to the receiving output ends Rx1 and Rx2. In this instance, the received signal output to the receiving output end Rx1 has an opposite phase to that of the received signal output to the receiving output end Rx2.

The impedance matching unit 122 is set in a same or similar manner of impedance ($Z_{ANT}$) as the antenna 130, and the transmitting signal is transmitted to the antenna 130 and the impedance matching unit 122. That is, the impedance matching unit 122 prevents the transmitting signal from being input to the receiving end (i.e., the secondary coil L2 of the hybrid transformer 121). The impedance matching unit 122 includes a plurality of balance networks ($Z_{BN\_1}$-$Z_{BN\_K}$) so as match the impedance in the wideband. As shown in FIG. 2, a plurality of balance networks ($Z_{BN\_1}$-$Z_{BN\_K}$) are respectively coupled in parallel to the second end of the primary coil L1. The impedances of the balance network are defined to be $Z_{BN\_1}$, $Z_{BN\_2}$, ..., $Z_{BN\_K}$, the impedance of the antenna 130 is defined to be $Z_{ANT}$, and the impedances of the respective balance networks are set so as to satisfy $Z_{ANT}=Z_{BN\_1}+Z_{BN\_2}, \ldots, +Z_{BN\_K}$. A method for setting the impedance will now be described. The impedance values of the balance networks are set by equally setting the impedance (i.e., $Z_{ANT}/K$) or unequally setting the impedance but setting the entire impedances to be $Z_{ANT}$.

The respective balance networks include a capacitor, an inductor, and a resistor that are passive elements, of which values are set to work for a specific frequency bandwidth. That is, the impedances of the balance networks are set, and capacitance, inductance, and resistance are set so that the balance networks may work for the different frequency bandwidths. The above-set balance networks tune different frequency bandwidths. For example, the balance network ($Z_{BN\_1}$) may be set to have a big SIC gain at a frequency f1, the balance network ($Z_{BN\_2}$) may be set to have a big SIC gain at a frequency f2, and the balance network ($Z_{BN\_K}$) may be set to have a big SIC gain at a frequency fk. The impedance matching unit 122 may have various kinds of combinations through a plurality of balance networks, by which it may improve the SIC gain in the wideband.

The divider 120 shown in FIG. 2 transmits the transmitting signal to the antenna 130 and the impedance matching unit 122, and prevents the transmitting signal from being input to the secondary coil of the hybrid transformer 121. That is, the impedance of the impedance matching unit 122 is set to correspond to impedance of the antenna 130, thereby preventing the transmitting signal from being output to the receiving output ends Rx1 and Rx2. The received signal provided through the antenna 130 is output to the receiving output ends Rx1 and Rx2 by the hybrid transformer 121.

The divider 120 according to an exemplary embodiment of the present invention may be applied to another exemplary embodiment to be described.

An interference amount of the self-transmitting interference signal may be reduced by the divider 120 according to an exemplary embodiment of the present invention, but the reduced amount may not solve the quantization error problem generated in the digital region. To solve the problem, the in-band full duplex transceiver 100 according to an exemplary embodiment of the present invention includes the FIR filter 140.

The antenna 130 simultaneously performs a transmission function and a receiving function. The transmitting signal is transmitted and the received signal is received through the antenna 130.

The first combiner 150 combines received signals output by the receiving output end Rx1 and the receiving output end Rx2. In this instance, since the received signal output by the receiving output end Rx1 has the opposite phase of the received signal output by the receiving output end Rx2, the first combiner 150 subtracts the received signal output by the receiving output end Rx2 from the received signal output by the receiving output end Rx1 and combines the two signals. In FIG. 1, the combined received signal is denoted as x, and the received signal (x) includes a self-received signal of the in-band full duplex transceiver 100 and a self-transmitting interference signal of the in-band full duplex transceiver 100. The transmitting signal (w) is prevented from being input to the receiving end (e.g., LNA) by the divider 120, part thereof is applied to the receiving end (e.g., LNA) to function as an interference signal, and the interference signal signifies the self-transmitting interference signal. The self-transmitting interference signal will be denoted as x̃. In an exemplary embodiment of the present invention, the self-transmitting interference signal (x̃) will be canceled by using the FIR filter 140.

The FIR filter 140 receives the transmitting signal (w), generates a signal for minimizing the self-transmitting interference signal (x̃), and outputs a resultant signal. A detailed configuration and an operation of the FIR filter 140 will be described in detail with reference to FIG. 3.

The second combiner 160 combines the received signal and the output signals of (x) of the FIR filter 140 and outputs a resultant signal to the LNA 170. The second combiner 160 subtracts the signal output by the FIR filter 140 from the received signal (x) and combines the two signals. In this instance, the FIR filter 140 outputs a signal for minimizing the self-transmitting interference signal ($\tilde{x}$) so the second combiner 160 outputs a signal generated by canceling the self-transmitting interference signal ($\tilde{x}$) from the received signal (x) to the LNA 170.

The LNA 170 receives the self-transmitting interference signal ($\tilde{x}$)-canceled received signal from the second combiner 160, removes noise from the input signal, and amplifies the resultant signal. The LNA 170 configures part of the receiver.

Figure 3:
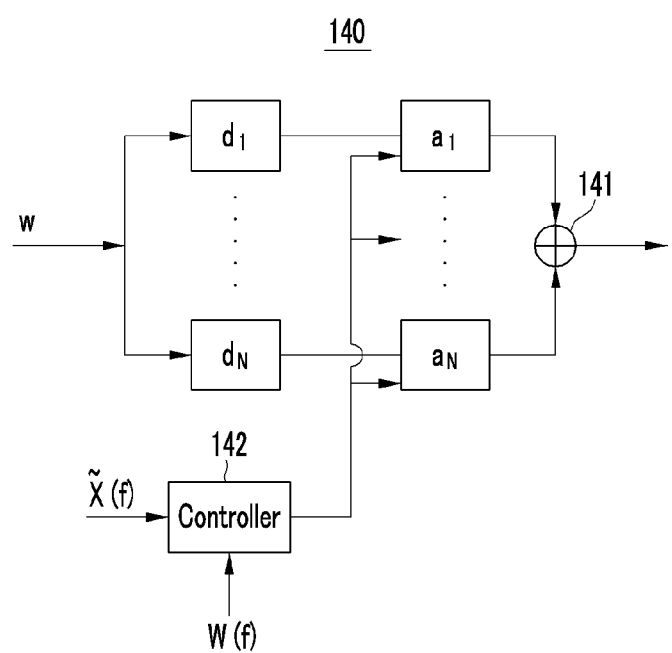
FIG. 3 shows an FIR filter according to an exemplary embodiment of the present invention.

FIG. 3 shows an FIR filter 140 according to an exemplary embodiment of the present invention.

As shown in FIG. 3, the FIR filter 140 includes a plurality of delay units ($d_1$-$d_N$), a plurality of attenuators ($a_1$-$a_N$), a combiner 141, and a controller 142.

The delay units ($d_1$-$d_N$) respectively include a fixed delay. Delay intervals among the delay units ($d_i$ (i=1, 2, ..., N)) may be equal or different and may be divided into a plurality of groups with a same delay interval.

The attenuators ($a_1$-$a_N$) are connected to the delay units ($d_1$-$d_N$) and attenuate signals. Attenuation degrees of the attenuators ($a_i$ (i=1, 2, ..., N)) are tunable, and are set by the controller 142.

The controller 142 sets the attenuation degrees of the attenuators ($a_1$-$a_N$) in a tunable manner. The controller 142 finds the attenuation degrees of a plurality of attenuators ($a_1$-$a_N$) by using a signal ($\tilde{X}(f)$) acquired by converting the self-transmitting interference signal ($\tilde{x}$) into a frequency domain and a signal (W(f)) acquired by converting the transmitting signal (w) into the frequency domain. Here, the signal $\tilde{X}(f)$ may be found by using frequency-domain subcarriers included in a head of a packet including the self-received signal or neighboring packets, which is known to a person skilled in the art and will not be described.

A method for the controller 142 to find the attenuation degrees of a plurality of attenuators ($a_1$-$a_N$) will now be described.

A method for finding an attenuation degree $a_i$ of the FIR filter 140 when the delay intervals of the delay units ($d_i$ (i=1, 2, ..., N)) are the same or different will now be described. The method may be expressed as Equation 1.

$$\min_{a_1, a_2, \ldots, a_N} \left( \underbrace{\tilde{x}(t)}_{Self-Interference} - \sum_{i=1}^{N} a_i \underbrace{w(t-d_i)}_{Tapped\ signal\ of\ reference\ signal} \right)^2 \quad \text{(Equation 1)}$$

The received signal (x) is not used and the self-transmitting interference signal ($\tilde{x}$) is used. The received signal (x) of FIG. 1 corresponds to a sum of the self-transmitting interference signal ($\tilde{x}$) and the self-received signal. Therefore, when x is used, the self-received signal may be attenuated as well as the self-transmitting interference signal at a front end of the LNA 170 so the self-transmitting interference signal ($\tilde{x}$) is used in Equation 1. It is not easy in a time domain to find a filter coefficient (i.e., $a_i$) of the time domain as expressed in Equation 1. Hence, the filter coefficient may be found by converting Equation 1 into the frequency domain. A method for finding $a_i$ of the FIR filter 140 in the frequency domain is expressed in Equation 2.

$$\min_{a_1, a_2, \ldots, a_N} \left( \underbrace{\tilde{X}(f)}_{Self-Interference} - \sum_{m=1}^{N} a_m W(f) e^{-j2\pi d_m f} \right)^2 \quad \text{(Equation 2)}$$

As expressed in Equation 2, the controller 142 may find the attenuation degrees of a plurality of attenuators ($a_1$-$a_N$) satisfying Equation 2 by using the signal ($\tilde{X}(f)$) acquired by converting the self-transmitting interference signal ($\tilde{x}$) into the frequency domain and the signal (W(f)) acquired by converting the transmitting signal (w) into the frequency domain. In Equation 2, the portion ( )² has a secondary equation on the attenuation degrees of the attenuators ($a_1$-$a_N$) so a minimum value of the secondary equation may be found. A method of finding $a_1$, $a_2$, ..., $a_N$ satisfying Equation 2 is known to a person skilled in the art and a description thereof will be omitted.

A method for finding an attenuation degree $a_i$ of the FIR filter 140 when two groups ($a_1$-$a_L$, $a_{L+1}$-$a_N$) with a same delay interval among the delay units ($d_i$ (i=1, 2, ..., N)) are provided will now be described. The method may be expressed in Equation 3 in the frequency domain.

$$\min_{a_1, a_2, \ldots, a_L} \left( \underbrace{\tilde{X}(f)}_{Self-Interference} - \sum_{m=1}^{L} a_m W(f) e^{-j2\pi d_m f} \right)^2 \quad \text{(Equation 3)}$$

$$\min_{a_{L+1}, a_{L+2}, \ldots, a_N} \left( \underbrace{\tilde{X}(f)}_{Self-Interference} - \sum_{m=L+1}^{N} a_m W(f) e^{-j2\pi d_m f} \right)^2$$

For convenience of description, an example (when the delay intervals are the same or different) of the first delay interval will be described, and examples of the second delay interval and other delay intervals are applicable.

As described above, the in-band full duplex transceiver 100 according to an exemplary embodiment of the present invention may improve the frequency characteristic (i.e., applicable to the wideband) and may solve the quantization error problem in the digital region by applying the divider 120 and the FIR filter 140.

Figure 4:
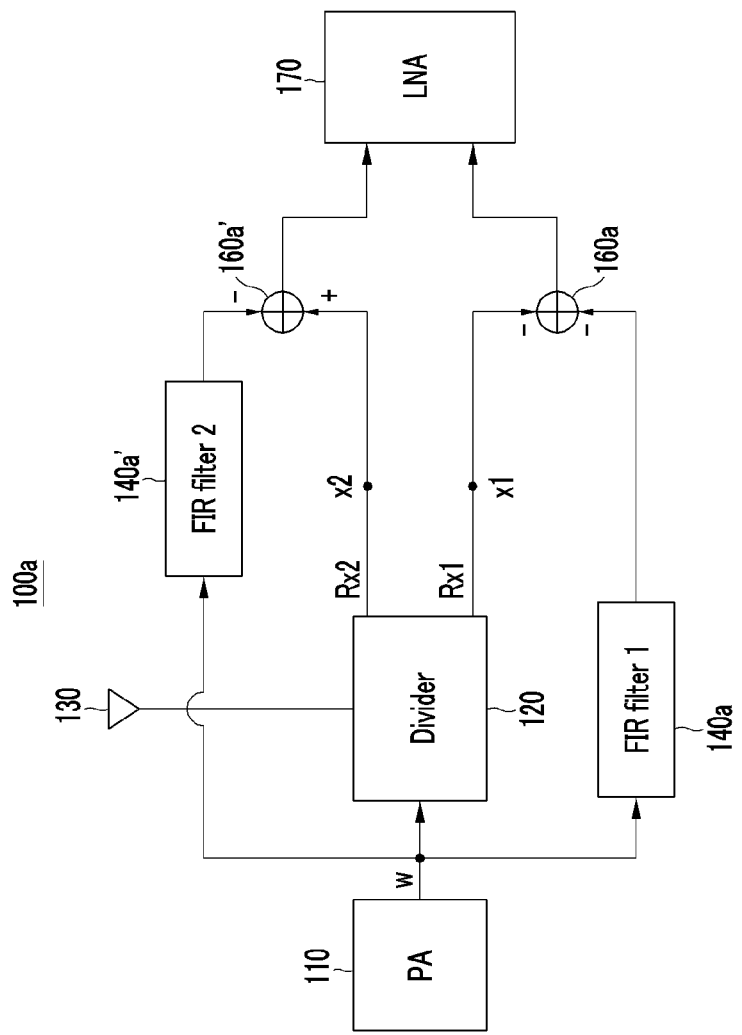
FIG. 4 shows an in-band full duplex transceiver according to another exemplary embodiment of the present invention.

FIG. 4 shows an in-band full duplex transceiver 100a according to another exemplary embodiment of the present invention.

As shown in FIG. 4, the in-band full duplex transceiver 100a includes a power amplifier (PA) 110, a divider 120, an antenna 130, a first finite impulse response (FIR) filter 140a, a second FIR filter 140a', a first combiner 160a, a second combiner 160a', and a low noise amplifier (LNA) 170. The in-band full duplex transceiver 100a shown in FIG. 4 corresponds to the in-band full duplex transceiver 100 shown in FIG. 1 except that it uses two FIR filters and combines signals. No repeated descriptions will be provided.

The transmitting signal (w) output by the PA 110 is input to the divider 120, the first FIR filter 140a, and the second FIR filter 140a'.

As described with reference to FIG. 1 and FIG. 2, the divider 120 phase-inverts the received signal provided by the antenna 130 to separate the same, and outputs the separated received signals to the receiving output end Rx1 and the receiving output end Rx2. In FIG. 4, a combined received signal (a sum of a self-received signal and a self-transmitting interference signal) output to the receiving output end Rx1 is indicated by x1, and a combined received signal (a sum of a self-received signal and a self-transmitting interference signal) output to the receiving output end Rx2 is indicated by x2. The signals x1 and x2 are phase-inverted from each other. Regarding the signal x1, the self-transmitting interference signal will be shown to be ($\widetilde{x1}$), and regarding the signal x2, the self-transmitting interference signal will be shown to be ($\widetilde{x2}$). The self-transmitting interference signal ($\widetilde{x1}$) is canceled by the first FIR filter 140a, and the self-transmitting interference signal ($\widetilde{x2}$) is canceled by the second FIR filter 140a'.

The first FIR filter 140a receives the transmitting signal (w), generates a signal for minimizing the self-transmitting interference signal ($\widetilde{x1}$), and outputs the same. The second FIR filter 140a' receives the transmitting signal (w), generates a signal for minimizing the self-transmitting interference signal ($\widetilde{x2}$), and outputs the same. Configurations of the first FIR filter 140a and the second FIR filter 140a' are similar to that of the FIR filter 140 of FIG. 3, and operations thereof are similar to that of the FIR filter 140 of FIG. 3.

The first combiner 160a combines the received signal x1 and the output signal of the first FIR filter 140a and outputs a resultant signal to the LNA 170. The first combiner 160a subtracts the signal output by the first FIR filter 140a from a signal (i.e., −x1) generated by inverting the received signal x1, and combines the two signals. Here, the first combiner 160a inverts the received signal x1 because the received signal x1 is a phase-inverted received signal. In this instance, the first FIR filter 140a outputs the signal for minimizing the self-transmitting interference signal ($\widetilde{x1}$), so the first combiner 160a outputs a signal generated by canceling the self-transmitting interference signal ($\widetilde{x1}$) from the inverted received signal −x1 to the LNA 170.

The second combiner 160a combines the received signal x2 and an output signal of the second FIR filter 140a and outputs a resultant signal to the LNA 170. The second combiner 160a subtracts the signal output by the second FIR filter 140a from the received signal x2 and combines the two signals. In this instance, the second FIR filter 140a outputs the signal for minimizing the self-transmitting interference signal ($\widetilde{x2}$), so the second combiner 160a outputs a signal generated by canceling the self-transmitting interference signal ($\widetilde{x2}$) from the received signal x2 to the LNA 170.

The LNA 170 receives a received signal from which the self-transmitting interference signal ($\widetilde{x1}$) is canceled from the first combiner 160a and a received signal from which self-transmitting interference signal ($\widetilde{x2}$) is canceled from the second combiner 160a, cancels noise from the two received signals, and amplifies the same. Alternatively, the LNA 170 receives a signal generated by combining the received signal from which the self-transmitting interference signal ($\widetilde{x1}$) is canceled from the first combiner 160a and the received signal from which the self-transmitting interference signal ($\widetilde{x2}$) is canceled from the second combiner 160a', cancels noise from the two signals, and amplifies the same.

A method for the first FIR filter 140a and the second FIR filter 140a' to find attenuation degrees of a plurality of attenuators ($a_1$-$a_N$) will now be described. A method for the first FIR filter 140a and the second FIR filter 140a' to find the attenuation degrees $a_i$ when the delay intervals among the delay units ($d_i$ (i=1, 2, . . . , N)) are the same or different will now be described. The method is expressed in Equation 4.

$$\min_{a_1, a_2, \ldots, a_N} \left( \underbrace{-\widetilde{x1}(t)}_{Self-Interference} - \sum_{i=1}^{N} a_i \underbrace{w(t-d_i)}_{Tapped\ signal\ of\ reference\ signal} \right)^2 \quad \text{(Equation 4)}$$

$$\min_{a_1, a_2, \ldots, a_N} \left( \underbrace{\widetilde{x2}(t)}_{Self-Interference} - \sum_{i=1}^{N} a_i \underbrace{w(t-d_i)}_{Tapped\ signal\ of\ reference\ signal} \right)^2$$

It is not easy to find a filter coefficient (i.e., $a_i$) in the time domain expressed in Equation 4

Therefore, the filter coefficient may be found by converting Equation 4 into the frequency domain. A method for finding the filter coefficient ($a_i$) of the first FIR filter 140a and the second FIR filter 140a' in the frequency domain may be expressed in Equation 5.

$$\min_{a_1, a_2, \ldots, a_N} \left( \underbrace{-\widetilde{X1}(f)}_{Self-Interference} - \sum_{m=1}^{N} a_m W(f) e^{-j2\pi d_m f} \right)^2 \quad \text{(Equation 5)}$$

$$\min_{a_1, a_2, \ldots, a_N} \left( \underbrace{\widetilde{X2}(f)}_{Self-Interference} - \sum_{m=1}^{N} a_m W(f) e^{-j2\pi d_m f} \right)^2$$

As expressed in Equation 5, the first FIR filter 140a may find the attenuation degrees of a plurality of attenuators ($a_1$-$a_N$) satisfying Equation 5 by using the signal ($-\widetilde{X1}(f)$) generated by converting the self-transmitting interference signal ($-\widetilde{x1}$) into the frequency domain and the signal (W(f)) generated by converting the transmitting signal (w) into the frequency domain. The second FIR filter 140a' may find the attenuation degrees of a plurality of attenuators ($a_1$-$a_N$) satisfying Equation 5 by using the signal ($\widetilde{x2}(f)$) generated by converting the self-transmitting interference signal ($\widetilde{x2}$) into the frequency domain and the signal (W(f)) generated by converting the transmitting signal (w) into the frequency domain.

Figure 5:
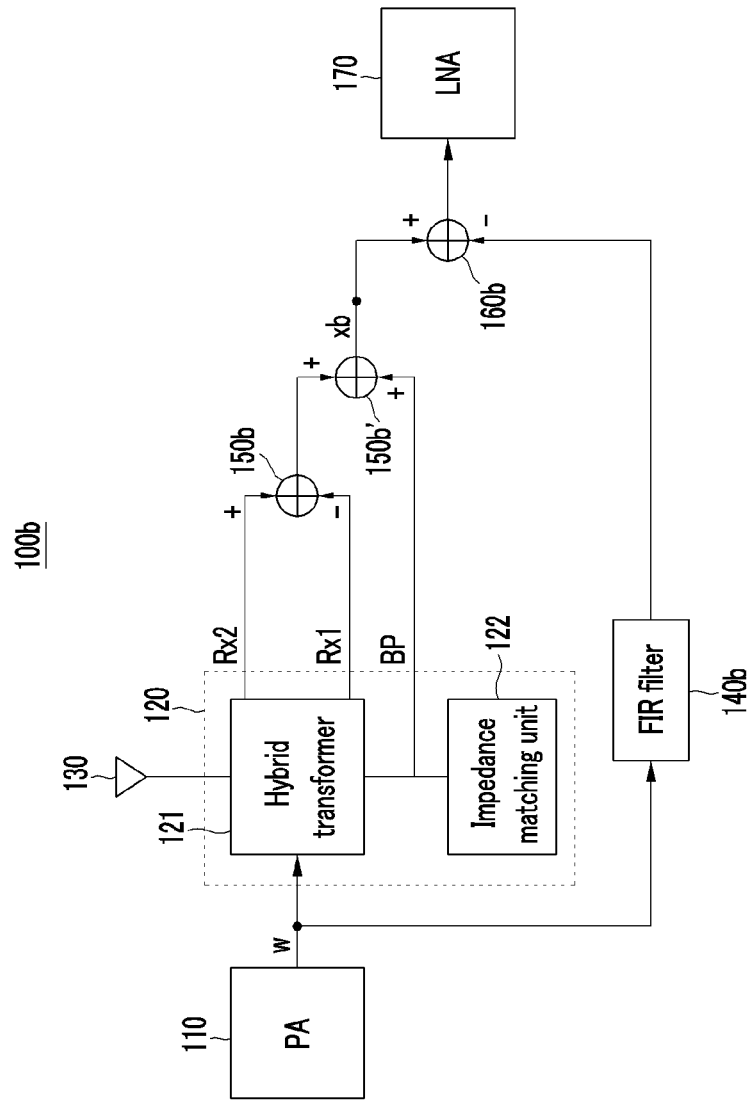
FIG. 5 shows an in-band full duplex transceiver according to the other exemplary embodiment of the present invention.

FIG. 5 shows an in-band full duplex transceiver 100b according to the other exemplary embodiment of the present invention.

As shown in FIG. 5, the in-band full duplex transceiver 100b includes a power amplifier 110, a divider 120, an antenna 130, an FIR filter 140b, a first combiner 150b, a second combiner 150b', a third combiner 160b, and a low noise amplifier 170. A configuration of combiners of the in-band full duplex transceiver 100b shown in FIG. 5 is similar to that shown in FIG. 1 except for different portions. Therefore, no repeated descriptions will be provided.

The divider 120 includes a hybrid transformer 121 and an impedance matching unit 122. The hybrid transformer 121 transmits a transmitting signal (w) to the antenna 130 and the impedance matching unit 122. A signal corresponding to a signal at a rear end of the PA 110 or a transmitting signal of the antenna 130 is output to a node (a balance point (BP) hereinafter) of the hybrid transformer 121 and the impedance matching unit 122. The impedance matching unit 122 is configured with passive elements, and controls the impedance applied to the antenna 130 and the impedance applied to the impedance matching unit 122 to be the same. The received signal provided by the antenna 130 is phase-inverted and separated by the hybrid transformer 121, and the separated received signal is output to the receiving output end Rx1 and the receiving output end Rx2. The signal provided by the antenna 130 is output to the balance point (BP). Therefore, part of the received signal as well as part of the transmitting signal is output to the balance point (BP).

The first combiner 150b combines the received signals output by the receiving output end Rx1 and the receiving output end Rx2. In this instance, the received signal output by the receiving output end Rx1 and the received signal output by the receiving output end Rx2 have opposite phases to each other, so the first combiner 150b subtracts the received signal output by the receiving output end Rx2 from the received signal output by the receiving output end Rx1, and combines the two signals.

The second combiner 150b' combines the signal output by the first combiner 150b and the signal output by the balance point (BP). In this instance, the signal output by the first combiner 150b and the signal output by the balance point (BP) have a same phase so the second combiner 150b' combines the two signals. Referring to FIG. 5, the signal output by the second combiner 150b' is indicated by xb, and the signal xb includes a self-received signal of the in-band full duplex transceiver 100b and a self-transmitting interference signal of the in-band full duplex transceiver 100b. The self-transmitting interference signal among the signal xb will be shown as $\widetilde{xb}$. According to an exemplary embodiment of the present invention, the self-transmitting interference signal ($\widetilde{xb}$) is canceled by using the FIR filter 140b.

The FIR filter 140b receives a transmitting signal (w), generates a signal for minimizing the self-transmitting interference signal ($\widetilde{xb}$), and outputs a resultant signal. A configuration of the FIR filter 140b is similar to that of the FIR filter 140 described with reference to FIG. 3, and an operation thereof is similar to that of the FIR filter 140 described with FIG. 3.

The third combiner 160b combines the output signal (xb) of the second combiner 150b' and the output signal of the FIR filter 140b, and outputs a resultant signal to the LNA 170. The third combiner 160b subtracts the signal output by the second FIR filter 140b from the signal xb and combines the two signals. In this instance, the third FIR filter 140b outputs a signal for minimizing the self-transmitting interference signal ($\widetilde{xb}$) so the third combiner 160b outputs the signal generated by canceling the self-transmitting interference signal ($\widetilde{xb}$) from the signal xb to the LNA 170.

A method for the FIR filter 140b to find the attenuation degrees of a plurality of attenuators ($a_1$-$a_N$) will now be described. The method for the FIR filter 140b to find the attenuation degree $a_i$ when delay intervals of the delay units ($d_i$ (i=1, 2, . . . , N)) are the same or different will now be described. The method is expressed in Equation 6.

$$\min_{a_1, a_2, \ldots, a_N} \left( \underbrace{\widetilde{xb}(t)}_{Self-Interference} - \sum_{i=1}^{N} a_i \underbrace{w(t-d_i)}_{Tapped\ signal\ of\ reference\ signal} \right)^2 \quad \text{(Equation 6)}$$

It is not easy in the time domain to find the filter coefficient (i.e., $a_i$) of the time domain expressed in Equation 6. Therefore, the filter coefficient may be found by converting Equation 6 into the frequency domain. A method for finding $a_i$ of the FIR filter 140b in the frequency domain is expressed in Equation 7.

$$\min_{a_1, a_2, \ldots, a_N} \left( \underbrace{\widetilde{Xb}(f)}_{Self-Interference} - \sum_{m=1}^{N} a_m W(f) e^{-j2\pi d_m f} \right)^2 \quad \text{(Equation 7)}$$

As expressed in Equation 7, the FIR filter 140b may find the attenuation degrees of a plurality of attenuators ($a_1$-$a_N$) satisfying Equation 7 by using the signal ($\widetilde{xb}(f)$) generated by converting the self-transmitting interference signal ($\widetilde{xb}$) into the frequency domain and the signal (W(f)) generated by converting the transmitting signal (w) into the frequency domain.

Figure 6:
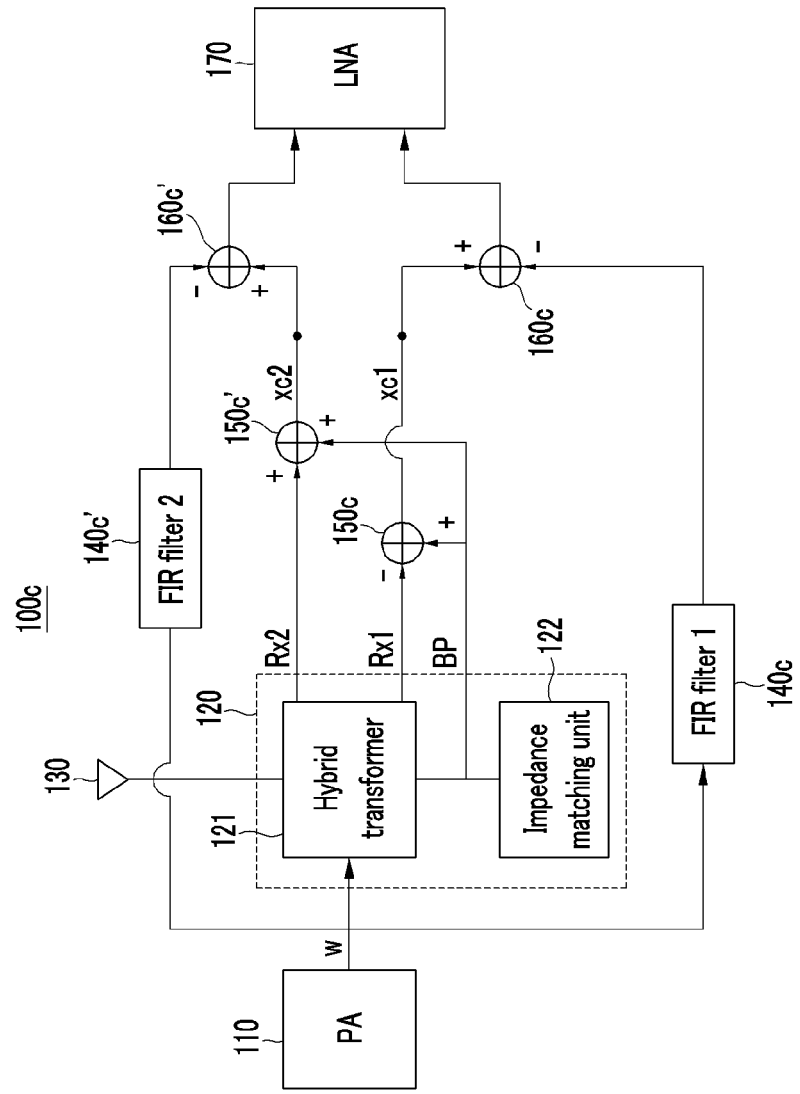
FIG. 6 shows an in-band full duplex transceiver according to the other exemplary embodiment of the present invention.

FIG. 6 shows an in-band full duplex transceiver 100c according to the other exemplary embodiment of the present invention.

As shown in FIG. 6, the in-band full duplex transceiver 100c includes a power amplifier 110, a divider 120, an antenna 130, a first FIR filter 140c, a second FIR filter 140c', a first combiner 150c, a second combiner 150c', a third combiner 160c, a fourth combiner 160c', and a low noise amplifier 170. The in-band full duplex transceiver 100c of FIG. 6 is similar to the in-band full duplex transceiver 100b of FIG. 5 except that it uses two FIR filters and combines signals. Therefore, no repeated descriptions will be provided.

The transmitting signal (w) output by the PA 110 is input to the divider 120, the first FIR filter 140c, and the second FIR filter 140c'.

As described with reference to FIG. 4, the received signal provided by the antenna 130 is phase-inverted by the hybrid transformer 121 and is then separated, and the separated received signal is output to the receiving output end Rx1 and the receiving output end Rx2. The signal provided by the antenna 130 is output to the balance point (BP). Therefore, part of the received signal as well as part of the transmitting signal is output to the balance point (BP).

The first combiner 150c combines the signal output by the receiving output end Rx1 and the signal output to the balance point (BP). In this instance, the signal output by the receiving output end Rx1 and the signal output by the balance point (BP) have opposite phases from each other, so the first combiner 150c subtracts the signal output to the receiving output end Rx1 from the signal output to the balance point (BP) and combines the two signals. In FIG. 6, the signal output by the first combiner 150c is indicated by xc1, and the signal xc1 includes a self-received signal of the in-band full duplex transceiver 100c and a self-transmitting interference signal of the in-band full duplex transceiver 100c. A self-transmitting interference signal from among the signal xc1 will be denoted as $\widetilde{xc1}$. The self-transmitting interference signal ($\widetilde{xc1}$) will be canceled by use of the first FIR filter 140c.

The second combiner 150c' combines the signal output by the receiving output end Rx2 and the signal output by the balance point (BP). The signal output by the receiving output end Rx2 and the signal output to the balance point (BP) have a same phase, so the second combiner 150c' combines the two signals. In FIG. 5, the signal output by the second combiner 150c' is indicated by xc2, and the signal xc2 includes a self-received signal of the in-band full duplex transceiver 100c and a self-transmitting interference signal of the in-band full duplex transceiver 100c. The self-transmitting interference signal from among xc2 will be denoted as $\widetilde{xc2}$. The self-transmitting interference signal ($\widetilde{xc2}$) is canceled by using the second FIR filter 140c'.

The first FIR filter 140c receives a transmitting signal (w), generates a signal for minimizing the self-transmitting interference signal ($\widetilde{xc1}$), and outputs the same. The second FIR filter 140c' receives a transmitting signal (w), generates a signal for minimizing the self-transmitting interference signal ($\widetilde{xc2}$), and outputs the same. Configurations of the first FIR filter 140c and the second FIR filter 140c' correspond to that of the FIR filter 140 of FIG. 3, and operations thereof are similar to that of the FIR filter 140 of FIG. 3.

The third combiner 160c combines the output signal xc1 of the first combiner 150c and the output signal of the first FIR filter 140c, and outputs a resultant signal to the LNA 170. The third combiner 160c subtracts the signal output by the first FIR filter 140c from the signal xc1, and combines the two signals. In this instance, the third FIR filter 140c outputs a signal for minimizing the self-transmitting interference signal ($\widetilde{xc1}$), so the third combiner 160c outputs a signal generated by canceling the self-transmitting interference signal ($\widetilde{xc1}$) from the signal xc1 to the LNA 170.

The fourth combiner 160c' combines an output signal xc2 of the second combiner 150c' and an output signal of the second FIR filter 140c', and outputs a resultant signal to the LNA 170. The LNA 170 receives a signal generated by combining the self-transmitting interference signal canceled received signal by the third combiner 160c and the self-transmitting interference signal canceled received signal by the fourth combiner 160c', cancels noise from the received signals, and amplifies the same.

The fourth combiner 160c' subtracts the signal output by the second FIR filter 140c' from the signal xc2 and combines the two signals. In this instance, the fourth FIR filter 140c' outputs a signal for minimizing the self-transmitting interference signal ($\widetilde{xc2}$), so the fourth combiner 160c' outputs a signal generated by canceling the self-transmitting interference signal ($\widetilde{xc2}$) from the signal xc2 to the LNA 170.

A method for the first FIR filter 140c and the second FIR filter 140c' to find an attenuation degree of a plurality of attenuators ($a_1$-$a_N$) will now be described. The method for the first FIR filter 140c and the second FIR filter 140c' to find the attenuation degree $a_i$ when the delay intervals of the delay units ($d_i$ (i=1, 2, . . . , N)) are the same or different will now be described. The method is expressed in Equation 8.

$$\min_{a_1,a_2,\cdots,a_N} \left( \underbrace{\widetilde{xc1}(t)}_{Self-Interference} - \sum_{i=1}^{N} a_i \underbrace{w(t-d_i)}_{Tapped\ signal\ of\ reference\ signal} \right)^2$$

$$\min_{a_1,a_2,\cdots,a_N} \left( \underbrace{\widetilde{xc2}(t)}_{Self-Interference} - \sum_{i=1}^{N} a_i \underbrace{w(t-d_i)}_{Tapped\ signal\ of\ reference\ signal} \right)^2$$

(Equation 8)

It is not easy in the time domain to find the filter coefficient (i.e., $a_i$) of the time domain expressed in Equation 8. Therefore, the filter coefficient may be found by converting Equation 8 into the frequency domain. A method for finding $a_i$ of the first FIR filter 140c and the second FIR filter 140c' in the frequency domain is expressed in Equation 9.

$$\min_{a_1,a_2,\cdots,a_N} \left( \underbrace{\widetilde{Xc1}(f)}_{Self-Interference} - \sum_{m=1}^{N} a_m W(f) e^{-j2\pi d_m f} \right)^2$$

$$\min_{a_1,a_2,\cdots,a_N} \left( \underbrace{\widetilde{Xc2}(f)}_{Self-Interference} - \sum_{m=1}^{N} a_m W(f) e^{-j2\pi d_m f} \right)^2$$

(Equation 9)

As expressed in Equation 9, the FIR filter 140c may find the attenuation degree of a plurality of attenuators ($a_1$-$a_N$) satisfying Equation 9 by using the signal (DeletedTexts) generated by converting the self-transmitting interference signal (DeletedTexts) into the frequency domain and the signal (W(f)) generated by converting the transmitting signal (w) into the frequency domain. The second FIR filter 140c' may find the attenuation degrees of a plurality of attenuators ($a_1$-$a_N$) satisfying Equation 9 by using the signal (DeletedTexts) generated by converting the self-transmitting interference signal (DeletedTexts) into the frequency domain and the signal (W(f)) generated by converting the transmitting signal (w) into the frequency domain.

Figure 7:
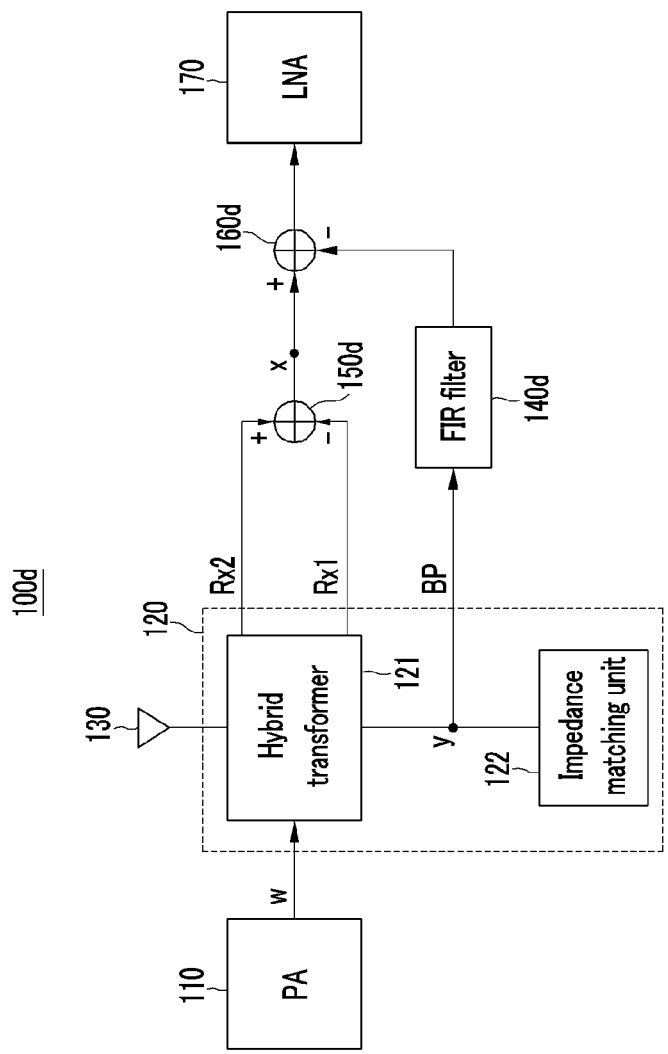
FIG. 7 shows an in-band full duplex transceiver according to the other exemplary embodiment of the present invention.

FIG. 7 shows an in-band full duplex transceiver 100d according to the other exemplary embodiment of the present invention.

As shown in FIG. 7, the in-band full duplex transceiver 100d includes a power amplifier 110, a divider 120, an antenna 130, an FIR filter 140d, a first combiner 150d, a second combiner 160d, and a low noise amplifier 170.

As described above, the hybrid transformer 121 transmits the transmitting signal (w) to the antenna 130 and the impedance matching unit 122. That is, a signal corresponding to a signal at a rear end of the PA 110 or a transmitting signal of the antenna 130 is output to the balance point (BP). In FIG. 7, the signal output to the balance point (BP) is indicated by y. The received signal provided by the antenna 130 is phase-inverted by the hybrid transformer 121 and is then separated, and the separated received signal is output to the receiving output end Rx1 and the receiving output end Rx2.

The first combiner 150d combines the received signals output by the receiving output end Rx1 and the receiving output end Rx2. In this instance, the received signal output by the receiving output end Rx1 and the received signal output by the receiving output end Rx2 have opposite phases from each other, so the first combiner 150d subtracts the received signal output by the receiving output end Rx2 from the received signal output by the receiving output end Rx1 and combines the two signals. The signal output by the first combiner 150d corresponds to the signal x of FIG. 1 so it is denoted as x. The signal x includes a self-received signal of the in-band full duplex transceiver 100d and a self-transmitting interference signal of the in-band full duplex transceiver 100. In a like manner of FIG. 1, the self-transmitting interference signal from among the signal x is denoted as $\tilde{x}$. The self-transmitting interference signal ($\tilde{x}$) is canceled by using the FIR filter 140d.

The FIR filter 140d receives an output signal (y) of the balance point (BP), generates a signal for minimizing the self-transmitting interference signal ($\tilde{x}$) and outputs the same. A configuration of the FIR filter 140d corresponds to that of the FIR filter 140 of FIG. 3, and an operation thereof is similar to that of the FIR filter 140 of FIG. 3. As described above, a signal corresponding to the transmitting signal (w) is output to the balance point (BP). Instead of directly using the transmitting signal (w), the FIR filter 140d uses the signal that corresponds to the transmitting signal (w) to generate the signal for minimizing the self-transmitting interference signal ($\tilde{x}$).

The second combiner 160d combines the output signal (x) of the first combiner 150d and the output signal of the FIR filter 140d, and outputs a resultant signal to the LNA 170. The second combiner 160d subtracts the signal output by the FIR filter 140d from the signal x and combines the two signals. In this instance, the FIR filter 140d outputs a signal for minimizing the self-transmitting interference signal ($\tilde{x}$) so the second combiner 160d outputs a signal generated by canceling the self-transmitting interference signal ($\tilde{x}$) from the signal x to the LNA 170.

A method for the FIR filter 140d to find an attenuation degree of a plurality of attenuators ($a_1$-$a_N$) will now be described. The method for the FIR filter 140d to find the attenuation degree $a_i$ when delay intervals of the delay units ($d_i$ (i=1, 2, ..., N)) are the same or different will now be described. The method is expressed in Equation 10.

$$\min_{a_1, a_2, \ldots, a_N} \left( \underbrace{\tilde{x}(t)}_{Self-Interference} - \sum_{i=1}^{N} a_i \underbrace{y(t-d_i)}_{Tapped\ signal\ of\ reference\ signal} \right)^2 \quad \text{(Equation 10)}$$

Equation 10 corresponds to Equation 1 except for the substitution of w for y.

It is not easy in the time domain to find the filter coefficient (i.e., $a_i$) of the time domain expressed in Equation 10. Therefore, the filter coefficient may be found by converting Equation 10 into the frequency domain. A method for finding $a_i$ of the FIR filter 140d in the frequency domain is expressed in Equation 11.

$$\min_{a_1, a_2, \ldots, a_N} \left( \underbrace{\tilde{X}(f)}_{Self-Interference} - \sum_{m=1}^{N} a_m Y(f) e^{-j2\pi d_m f} \right)^2 \quad \text{(Equation 11)}$$

As expressed in Equation 11, the FIR filter 140d may find an attenuation degree of a plurality of attenuators ($a_1$-$a_N$) satisfying Equation 11 by using the signal ($\tilde{X}(f)$) generated by converting the self-transmitting interference signal ($\tilde{x}$) into the frequency domain and the signal (Y(f)) generated by converting the output signal (y) of the balance point (BP) into the frequency domain.

Figure 8:
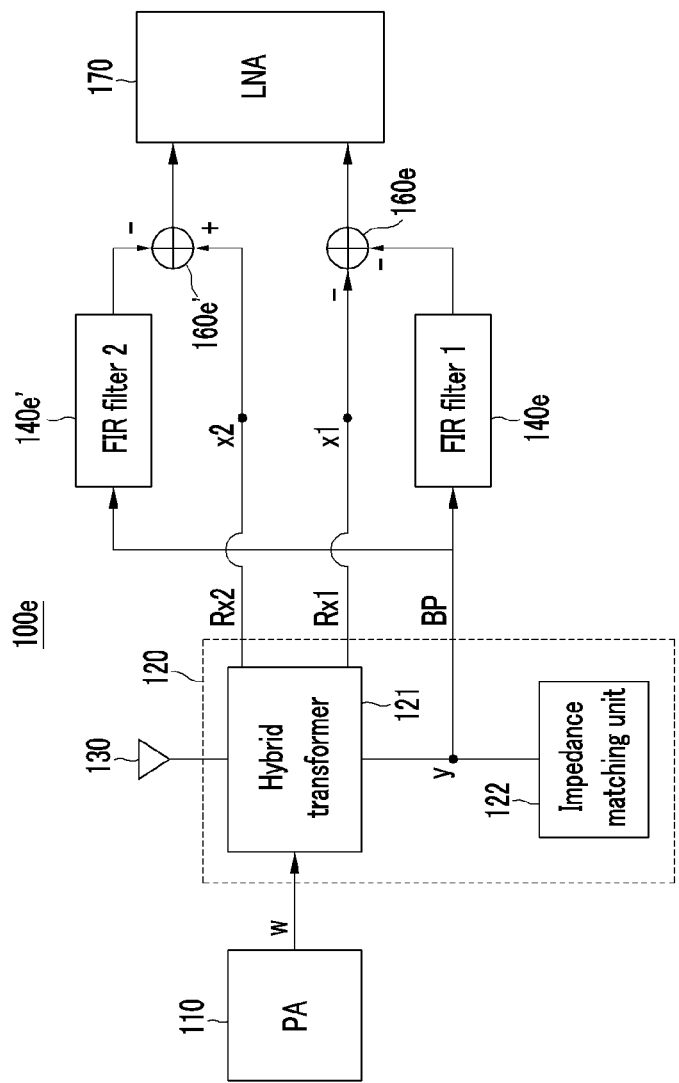
FIG. 8 shows an in-band full duplex transceiver according to the other exemplary embodiment of the present invention.

FIG. 8 shows an in-band full duplex transceiver 100e according to the other exemplary embodiment of the present invention.

As shown in FIG. 8, the in-band full duplex transceiver 100e includes a power amplifier (PA) 110, a divider 120, an antenna 130, a first finite impulse response (FIR) filter 140e, a second FIR filter 140e', a first combiner 160e, a second combiner 160e', and a low noise amplifier (LNA) 170. The in-band full duplex transceiver 100e of FIG. 8 is similar to the in-band full duplex transceiver 100d of FIG. 7 except that it uses two FIR filters and combines signals. Therefore, no repeated descriptions will be provided.

Referring to FIG. 8, a signal output by the receiving output end Rx1 corresponds to the signal x1 of FIG. 4 so it is denoted as x1, and a signal output by the receiving output end Rx2 corresponds to the signal x2 of FIG. 4 so it is denoted as x2. A self-transmitting interference signal from among the signal x1 is denoted as $\tilde{x1}$, and a self-transmitting interference signal from among the signal x2 is denoted as $\tilde{x2}$. The self-transmitting interference signal $\tilde{x1}$ is canceled by the first FIR filter 140e, and the self-transmitting interference signal $\tilde{x2}$ is canceled by the second FIR filter 140e'.

The first FIR filter 140e receives an output signal (y) of the balance point (BP), generates a signal for minimizing the self-transmitting interference signal ($\tilde{x1}$), and outputs the same. The second FIR filter 140e' receives the output signal (y) of the balance point (BP), generates a signal for minimizing the self-transmitting interference signal ($\tilde{x2}$), and outputs the same.

The first combiner 160e combines the output signal x1 of the receiving output end Rx1 and the output signal of the first FIR filter 140e, and outputs a resultant signal to the LNA 170. The first combiner 160e subtracts the signal output by the first FIR filter 140e from a signal (i.e., −x1) generated by inverting the output signal x1 of the receiving output end Rx1 and combines the two signals. Here, the first combiner 160e inverts the output signal x1 of the receiving output end Rx1 because it is a phase-inverted received signal. In this instance, the first FIR filter 140e outputs a signal for minimizing the self-transmitting interference signal ($\tilde{x1}$), so the first combiner 160e outputs a signal generated by canceling the self-transmitting interference signal ($\tilde{x1}$) from the inverted output signal −x1 of the receiving output end Rx1 to the LNA 170.

The second combiner 160e' combines an output signal x2 of the receiving output end Rx2 and an output signal of the second FIR filter 140e', and outputs a resultant signal to the LNA 170. The second combiner 160e' subtracts the signal output by the first FIR filter 140e from the output signal x1 of the receiving output end Rx1 and combines the two signals. In this instance, the second FIR filter 140e' outputs a signal for minimizing the self-transmitting interference signal ($\tilde{x2}$) so the second combiner 160e' outputs a signal generated by canceling the self-transmitting interference signal ($\tilde{x2}$) from the output signal x2 of the receiving output end Rx2 to the LNA 170. The LNA 170 receives a signal generated by combining the self-transmitting interference signal canceled received signal from the first combiner 160e and the self-transmitting interference signal canceled received signal from the second combiner 160e', cancels noise from the two signals, and amplifies the same.

A method for the first FIR filter 140e and the second FIR filter 140e' to find an attenuation degree of a plurality of attenuators ($a_1$-$a_N$) will now be described. A method for the first FIR filter 140e and the second FIR filter 140e' to find an attenuation degree $a_i$ when delay intervals of the delay units ($d_i$ (i=1, 2, ..., N)) are the same or different will now be described. The method is expressed in Equation 12.

$$\min_{a_1, a_2, \ldots, a_N} \left( \underbrace{-\tilde{x1}(t)}_{Self-Interference} - \sum_{i=1}^{N} a_i \underbrace{y(t-d_i)}_{Tapped\ signal\ of\ reference\ signal} \right)^2 \quad \text{(Equation 12)}$$

$$\min_{a_1, a_2, \ldots, a_N} \left( \underbrace{\tilde{x2}(t)}_{Self-Interference} - \sum_{i=1}^{N} a_i \underbrace{y(t-d_i)}_{Tapped\ signal\ of\ reference\ signal} \right)^2$$

It is not easy in the time domain to find the filter coefficient (i.e., $a_i$) of the time domain expressed in Equation 12. Therefore, the filter coefficient may be found by converting Equation 12 into the frequency domain. A method for finding $a_i$ of the first FIR filter 140e and the second FIR filter 140e' in the frequency domain is expressed in Equation 13.

$$\min_{a_1,a_2,\cdots,a_N} \left( \underbrace{-\widetilde{X1}(f)}_{Self-Interference} - \sum_{m=1}^{N} a_m Y(f) e^{-j2\pi d_m f} \right)^2 \quad \text{(Equation 13)}$$

$$\min_{a_1,a_2,\cdots,a_N} \left( \underbrace{\widetilde{X2}(f)}_{Self-Interference} - \sum_{m=1}^{N} a_m Y(f) e^{-j2\pi d_m f} \right)^2$$

As expressed in Equation 13, the first FIR filter 140e may find an attenuation degree of a plurality of attenuators ($a_1$-$a_N$) satisfying Equation 13 by using the signal ($-\tilde{X}(f)$) generated by converting the self-transmitting interference signal ($-\tilde{x}$) into the frequency domain and the signal (Y(f)) generated by converting the output signal (y) of the balance point (BP) into the frequency domain. The second FIR filter 140e' may find an attenuation degree of a plurality of attenuators ($a_1$-$a_N$) satisfying Equation 13 by using the signal ($\widetilde{X2}(f)$) generated by converting the self-transmitting interference signal ($\widetilde{X2}$) into the frequency domain and the signal (Y(f)) generated by converting the output signal (y) of the balance point (BP) into the frequency domain.

The in-band full duplex transceiver according to exemplary embodiments of the present invention described with reference to FIG. 1 to FIG. 8 may be applied to a multi-input multi-output (MIMO) transceiver. A method for applying the in-band full duplex transceiver to the MIMO transceiver is known to a person skilled in the art, so no detailed description thereof will be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An in-band full duplex transceiver comprising:
a transmitter for generating a transmitting signal;
a hybrid transformer that receives the transmitting signal and that includes a first end connected to an antenna, that outputs the transmitting signal to the antenna, and that outputs a received signal provided through the antenna to a receiver;
an impedance matching unit including a plurality of balance networks connected to a second end of the hybrid transformer, and that matches an impedance of the antenna, and
a finite impulse response (FIR) filter that receives the same transmitting signal.

2. The in-band full duplex transceiver of claim 1, wherein a sum of impedances of the balance networks corresponds to the impedance of the antenna.

3. The in-band full duplex transceiver of claim 1, wherein the balance networks is configured with at least one of a capacitor, an inductor, and a resistor, and the plurality of balance networks tune different frequency bandwidths.

4. The in-band full duplex transceiver of claim 2, wherein the hybrid transformer transmits the transmitting signal to the impedance matching unit.

5. The in-band full duplex transceiver of claim 1,
wherein the hybrid transformer includes a receiving output end for outputting the received signal, and
wherein the FIR filter cancels a self-transmitting interference signal included in a signal output by the receiving output end.

6. The in-band full duplex transceiver of claim 5, wherein the FIR filter includes:
a plurality of delay units for receiving the transmitting signal and delaying the same;
a plurality of attenuators connected to the delay units and attenuating a signal; and
a controller for setting an attenuation degree of the attenuator so as to cancel the self-transmitting interference signal, and the controller sets the attenuation degree for minimizing the self-transmitting interference signal by using a signal generated by converting the self-transmitting interference signal into a frequency domain and a signal generated by converting the transmitting signal into the frequency domain.

7. The in-band full duplex transceiver of claim 5, wherein the receiving output end includes a first receiving output end and a second receiving output end, and a first signal output by the first receiving output end and a second signal output by the second receiving output end are phase-inverted signals from each other.

8. The in-band full duplex transceiver of claim 7,
further comprising a first combiner for combining the first signal and the second signal, and a second combiner for combining an output signal of the first combiner and an output signal of the FIR filter, and outputting a resultant signal to the receiver,
wherein the FIR filter outputs a signal for canceling a self-transmitting interference signal included in the output signal of the first combiner to the second combiner.

9. The in-band full duplex transceiver of claim 7, wherein the FIR filter includes a first FIR filter for receiving the transmitting signal and canceling the self-transmitting interference signal included in the first signal and a second FIR filter for receiving the transmitting signal and canceling the self-transmitting interference signal included in the second signal, and the in-band full duplex transceiver further includes a first combiner for combining the first signal and an output signal of the first FIR filter, and outputting a resultant signal to the receiver, and a second combiner for combining the second signal and an output signal of the second FIR filter, and outputting a resultant signal to the receiver.

10. The in-band full duplex transceiver of claim 7, further comprising:
a first combiner for combining the first signal and the second signal;
a second combiner for combining an output signal of the first combiner and an output signal of the second end of the hybrid transformer; and
a third combiner for combining an output signal of the second combiner and an output signal of the FIR filter, and outputting a resultant signal to the receiver,
wherein the FIR filter outputs a signal for canceling a self-transmitting interference signal included in the output signal of the second combiner to the third combiner.

11. The in-band full duplex transceiver of claim 7,
wherein the in-band full duplex transceiver further includes a first combiner for combining the first signal and an output signal of the second end of the hybrid transformer and a second combiner for combining the second signal and an output signal of the second end of the hybrid transformer,
the FIR filter includes a first FIR filter for receiving the transmitting signal and canceling the self-transmitting interference signal included in the output signal of the first combiner and a second FIR filter for receiving the transmitting signal and canceling the self-transmitting interference signal included in the output signal of the second combiner, and
the in-band full duplex transceiver further includes a third combiner for combining the output signal of the first combiner and the output signal of the first FIR filter and a fourth combiner for combining the output signal of the second combiner and the output signal of the second FIR filter.

12. The in-band full duplex transceiver of claim 1,
wherein the hybrid transformer includes a receiving output end for outputting the received signal, and
the in-band full duplex transceiver further includes a finite impulse response (FIR) filter for receiving a signal of the second end of the hybrid transformer, and canceling a self-transmitting interference signal included in a signal output by the receiving output end.

13. The in-band full duplex transceiver of claim 12,
wherein the receiving output end includes a first receiving output end and a second receiving output end, and a first signal output by the first receiving output end and a second signal output by the second receiving output end are phase-inverted signals from each other.

14. The in-band full duplex transceiver of claim 13,
further comprising a first combiner for combining the first signal and the second signal, and a second combiner for combining an output signal of the first combiner and an output signal of the FIR filter, and outputting a resultant signal to the receiver,
wherein the FIR filter outputs a signal for canceling the self-transmitting interference signal included in the output signal of the first combiner to the second combiner.

15. The in-band full duplex transceiver of claim 13,
wherein the FIR filter includes a first FIR filter for receiving a signal of the second end of the hybrid transformer and canceling the self-transmitting interference signal included in the first signal and a second FIR filter or receiving a signal of the second end of the hybrid transformer and canceling the self-transmitting interference signal included in the second signal, and
the in-band full duplex transceiver further includes a first combiner for combining the first signal and an output signal of the first FIR filter and outputting a resultant signal to the receiver, and a second combiner for combining the second signal and an output signal of the second FIR filter and outputting a resultant signal to the receiver.

16. An in-band full duplex transceiver comprising:
a power amplifier for outputting a transmitting signal;
a transformer that receives the transmitting signal and that includes a primary coil having a first end connected to an antenna and a middle tab for receiving an output signal of the power amplifier, and a secondary coil for inducing a received signal provided through the antenna;
an impedance matching unit including a plurality of balance networks connected to a second end of the primary coil and matching impedance of the antenna; and
a finite impulse response (FIR) filter that receives the same transmitting signal and that cancels a self-transmitting interference signal included in signals output by respective ends of the secondary coil.

17. The in-band full duplex transceiver of claim 16, wherein a sum of impedances of the balance networks is determined corresponding to an impedance of the antenna.

18. The in-band full duplex transceiver of claim 17, wherein the balance networks are configured with at least one of a capacitor, an inductor, and a resistor, and the balance networks tune different frequency bandwidths.

19. The in-band full duplex transceiver of claim 17, wherein the FIR filter includes:
a plurality of delay units for receiving the transmitting signal and delaying the same;
a plurality of attenuators connected to the delay units and attenuating a signal; and
a controller for setting an attenuation degree of the attenuators so as to cancel the self-transmitting interference signal, and the controller sets the attenuation degree for minimizing the self-transmitting interference signal by using a signal generated by converting the self-transmitting interference signal into the frequency domain and a signal generated by converting the transmitting signal into the frequency domain.

20. The in-band full duplex transceiver of claim 18, wherein the networks are coupled in parallel with each other.

* * * * *